US005574469A

United States Patent [19]
Hsu

[11] Patent Number: 5,574,469
[45] Date of Patent: Nov. 12, 1996

[54] LOCOMOTIVE COLLISION AVOIDANCE METHOD AND SYSTEM

[75] Inventor: George C. C. Hsu, Fort Worth, Tex.

[73] Assignee: Burlington Northern Railroad Company, Fort Worth, Tex.

[21] Appl. No.: 360,401

[22] Filed: Dec. 21, 1994

[51] Int. Cl.$^6$ ............................................. G01S 3/02
[52] U.S. Cl. ............................ 342/455; 342/357; 364/461
[58] Field of Search .................................. 342/357, 455; 364/449, 461

[56] References Cited

U.S. PATENT DOCUMENTS

| | | |
|---|---|---|
| 2,762,913 | 9/1956 | Jepson . |
| 2,783,369 | 2/1957 | Weber . |
| 3,365,572 | 1/1968 | Strauss . |
| 4,473,787 | 9/1984 | Schick . |
| 4,701,760 | 10/1987 | Raoux . |
| 4,897,661 | 1/1990 | Hiraiwa . |
| 4,949,089 | 8/1990 | Ruszkowski, Jr. . |
| 5,068,654 | 11/1991 | Husher . |
| 5,153,836 | 10/1992 | Fraughton et al. ............ 364/461 |
| 5,155,490 | 10/1992 | Spradley, Jr. et al. . |
| 5,210,534 | 5/1993 | Janex . |
| 5,307,074 | 4/1994 | Janex . |
| 5,369,591 | 11/1994 | Broxmeyer ................... 364/461 |
| 5,396,426 | 3/1995 | Hibino et al. ................ 364/426.04 |
| 5,420,792 | 5/1995 | Butsuen et al. ............... 364/426.04 |
| 5,450,329 | 9/1995 | Tanner ......................... 364/449 |

Primary Examiner—Theodore M. Blum
Attorney, Agent, or Firm—Robert A. Felsman

[57] ABSTRACT

A method and system are disclosed for improved collision avoidance of two locomotives by periodically receiving on each locomotive digitally encoded data to determine its geographical location, speed and direction of travel by means of an onboard global positioning system receiver. A first data frame including this data is created on each locomotive. Each locomotive periodically broadcasts to the other digitally encoded signals containing the first data frame. A second data frame is created on each locomotive from the received digital signals from the other locomotive containing the second locomotive's geographical location, speed and direction of travel and locomotive identification. The data frames are processed and displayed onboard each locomotive to determine if the other is a collision candidate. If so, collision avoidance procedures are automatically initiated, including initiation of aural and visual alarms at a first selected distance and the reduction of speed at a second selected, closer distance. The speed reduction includes the application of the locomotive and/or train brakes and throttle reduction to arrest locomotive or train movement to complete cessation. The identity of each locomotive is established with an onboard operator input device and broadcast with other of the digitally encoded data.

8 Claims, 5 Drawing Sheets

LOCOMOTIVE COLLISION AVOIDANCE METHOD AND SYSTEM

BACKGROUND OF THE INVENTION

1. Field of the Invention

This invention relates to methods and apparatus used in railway systems for the detection of a collision candidate, such as a forward or rearward approaching locomotive or other track occupying vehicle, and more particularly to the automated invocation of collision avoidance measures.

2. Description of Prior Art

There are occasional collisions of trains that occur even though most locomotives are equipped with voice communication systems that should enable the engineers to detect collision candidates in time to initiate collision avoidance measures. There have been efforts to provide methods and apparatus that will detect and automatically avoid train collisions. The following patents represent proposed solutions to the long standing problem of vehicular collisions, some of them catastrophic, including collisions between locomotives.

2.1 Collision Avoidance Patents

U.S. Pat. No. 2,762,913 discloses a railway train proximity warning system that uses a transmitter and a receiver at each end of a train for sending coded signals, with control means to render each of the receivers inoperative during periods of radiation from the adjacent transmitter.

U.S. Pat. No. 2,783,369 discloses a radio transmitting and receiving signal system for use in a railway system to minimize accidents, the exact location of a train to be determined because the signal will vary linearly with the distance traveled and also indicate by its frequency the exact location of the train. This patent does not disclose any means for automatically avoiding collision and is believed to lack accuracy or relativity.

U.S. Pat. No. 3,365,572 discloses an automatic collision prevention, alarm and control system for use by trains that utilizes continuous beam lasers at each end of the train that are projected ahead and behind the train. Photo electric cell detectors are used to provide an audible or visual warning to the engineer and, at the same time, automatic control circuits may be operated to effect an emergency brake application or the automatic closing of the throttle. This system is not believed to be able to differentiate between locomotives, trains and railway maintenance-of-way (MOW) equipment, but rather, can give false indications caused by animals or automobiles at grade crossings.

U.S. Pat. No. 4,473,787 discloses a system for maintaining the spacing of trains or other track bound vehicles. It utilizes a light emitter, operating with modulated light and radiating uniformly and a light receiver to reduce the speed of the vehicle with increasingly received light intensity.

U.S. Pat. No. 4,701,760 discloses a method for monitoring vehicles from a central station by obtaining the approximate coordinate of the vehicle from signals transmitted by stations of the world omega network, using vehicle carried receivers. The approximate coordinates are corrected by reception and processing means connected to a fixed radiogoniometry beacons. Processing means connected to the vehicle-carried receiver supply the real coordinates of the vehicle to a vehicle-carried transmitter. The actual coordinates are transmitted in actual form to a receiver at a central station. Alarms on board the vehicle can be transmitted to the station.

U.S. Pat. No. 4,897,661 discloses a method and apparatus for determining the position of a vehicle with a system utilizing a transponder in each vehicle that transmits a signal responsive to an interrogation signal to a ground station through two or more satellites. The position of the vehicle is determined from the propagation time differences of the response signals received from the satellite.

U.S. Pat. No. 5,068,654 discloses a collision avoidance system that addresses the problem involved where there is a large number of vehicles in the same general area. Each vehicle is equipped with a collision avoidance transponder for transmitting and receiving data from the other vehicles. A central reference time signal generator is provided in a neutral position in order to transmit a periodic reference timing signal for reception at the transponders. Upon the transponder receiving the reference timing signal, it subsequently transmits information data relating to that vehicle for reception by the other vehicles. Each transponder is allocated a specific time slot or period which is unique to that vehicle for transmitting the information data.

U.S. Pat. No. 5,210,534 discloses an encoding method for anti-collision systems for sea navigation. Here, a transmitter aboard a ship transmits its geographical coordinates, speed and course, as well as an identification code.

U.S. Pat. No. 5,307,074 is another collision avoidance system for sea navigation. A transmitter aboard ship transmits its geographic coordinates, course and speed and a display exposes similar data from other ships. The received data are displayed, mostly in the form of symbols on the panoramic screen of the display device.

2.2 The GPS System

In the early 1980s, the Global Positioning System (GPS) satellite system began to come on line. GPS will eventually comprise 24 satellites in orbits approximately 11,000 miles above the earth's surface inclined 50 degrees from the equator. The satellites are not in a constant position, but have a 12 hour orbit. At any point on the earth a ground base receiver normally can receive signals from four GPS satellites. The satellites are tracked from ground stations by the U.S. Air Force. A basic explanation of GPS and its use in surveying is given in Hurn, GPS, A Guide to the Next Utility, Trimble Navigation 1989, incorporated herein by reference.

(a) PRN Code Information Signals. The GPS satellites each transmit signals containing groups of information that enable distance measurements to be made. There is transmission of a pseudo-random number (PRN) code from each satellite to a GPS receiver.

The PRN code is a very faint signal which hardly registers above the earth's natural background noise, yet can still be received by an antenna only inches in size. Decoding of these signals is accomplished in known fashion by sampling the PRN code and comparing the code with previously received signals over time, permitting the PRN code to be picked out of the earth's background noise.

The PRN code includes the time (as measured by an atomic clock aboard the satellite) at which the signal left the satellite. Over time, the signals include information about the satellite's current orbit in space as well as corrections for known errors in the satellite's clock (uploaded to the satellite periodically by the Department of Defense).

Two types of services produce signals from the GPS satellites. First, the Precise Positioning Service (PPS) produces for the military the most accurate dynamic positioning possible with GPS, based on the dual frequency Precise or Protected code known as the P-code. Users must have an encryption code to access the P-code which is not available to the public. Standard positioning service (SPS) produces the publicly accessible civilian positioning accuracy obtained by using the single frequency "Clear Acquisition" (C/A) code. The Department of Defense (DoD) has the ability to degrade the accuracy of the C/A code using "selective availability" (S/A) or artificially creating clock errors to prevent hostile military forces (e.g., jet aircraft) from navigating using the C/A code.

(b) Computation of Position Fixes Using GPS Signal Data. An earth-based receiver receives the PRN code and records the receive time as measured by the receiver's clock. Taking relative clock offsets into account, the difference between a signal's departure time and arrival time is the total travel time. The distance from the GPS satellite to the receiver's position is then approximated by multiplying the speed of light times the total travel time (refraction-and other errors must be taken into account as discussed in more detail below).

A minimum of three satellite signals are needed to determine position using GPS satellites. If all that is known is that the position in question is 11,000 miles from a first satellite the position could be anywhere on a sphere centered on that satellite and having an 11,000 mile radius. If two satellite distances are known, the position could be anywhere on a circle where the two satellite-centered spheres intersect. If three satellite distances are known, the position can only be at one of two points at which all three spheres intersect. For a position known to be on earth, one of these points will usually be a ridiculous answer (e.g., somewhere in space), so three satellites are enough to pinpoint a location.

(c) Atomic-Clock Timing of Satellite Signals. Because the speed of light is so fast, it only takes about 6/100ths of a second for a GPS satellite signal to travel to earth. To avoid satellite-distance errors (and therefore position-fix errors) arising from clock errors, very accurate clocks must therefore be used in both the satellite and receiver. GPS satellites use "atomic" clocks, that is, clocks driven by an atomic-standard oscillator, e.g., a cesium- or rubidium-standard oscillator. (Atomic clocks do not necessarily run on atomic energy, but use the oscillations of an atom as their "metronome" to keep extremely accurate time.)

Many satellite receivers use quartz-crystal oscillator clocks of lower accuracy than atomic clocks, whose cost is presently quite high. Collection of PRN code data from a fourth satellite can be made to compute time of arrival (by simultaneously solving four satellite distance equations with four unknowns) using only the satellites' on-board atomic clocks to eliminate the need for an atomic clock on the ground. Even with atomic clocks aboard the satellites, however, some error in timing occurs. Each satellite uses four atomic clocks which are additionally synchronized by the Colorado Springs Falcon Air Force Station with a cluster of clocks, or master time base to keep absolute time. Each satellite's four clocks or master oscillators have individual characteristic drifts. The drift errors are kept defined based on a master time base ("GPS time"). The satellites transmit the timing drift errors as part of the PRN code.

SUMMARY OF THE INVENTION

It is the general object of the invention to provide an improved method and apparatus that are especially useful in identifying locomotives or other railway vehicles that are forward or rearward collision candidates and automatically initiating collision avoidance measures.

The foregoing object is achieved as now described. A method and system are disclosed for improved collision avoidance of two locomotives by periodically receiving on each locomotive digitally encoded data to determine its geographical location, speed and direction of travel by means of an onboard global positioning system receiver. A first data frame including this data is created on each locomotive. Each locomotive periodically broadcasts to the other digitally encoded signals containing the first data frame. A second data frame is created on each locomotive from the received digital signals from the other locomotive containing the second locomotive's geographical location, speed and direction of travel, as well as locomotive identification and, optionally, other data such as track identification. The data frames are processed and displayed onboard each locomotive to determine if the other is a collision candidate. If so, collision avoidance procedures are automatically initiated, including initiation of aural and visual alarms at a first selected distance and the reduction of speed at a second selected, closer distance. The speed reduction is inclusive of the application of locomotive and/or train brakes and throttle reduction to arrest locomotive or train movement to complete cessation. The identity of each locomotive is established with an onboard operator input device and broadcast with other of the digitally encoded data. The above as well as additional objects, features, and advantages of the invention will become apparent in the following detailed description.

BRIEF DESCRIPTION OF THE DRAWING

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
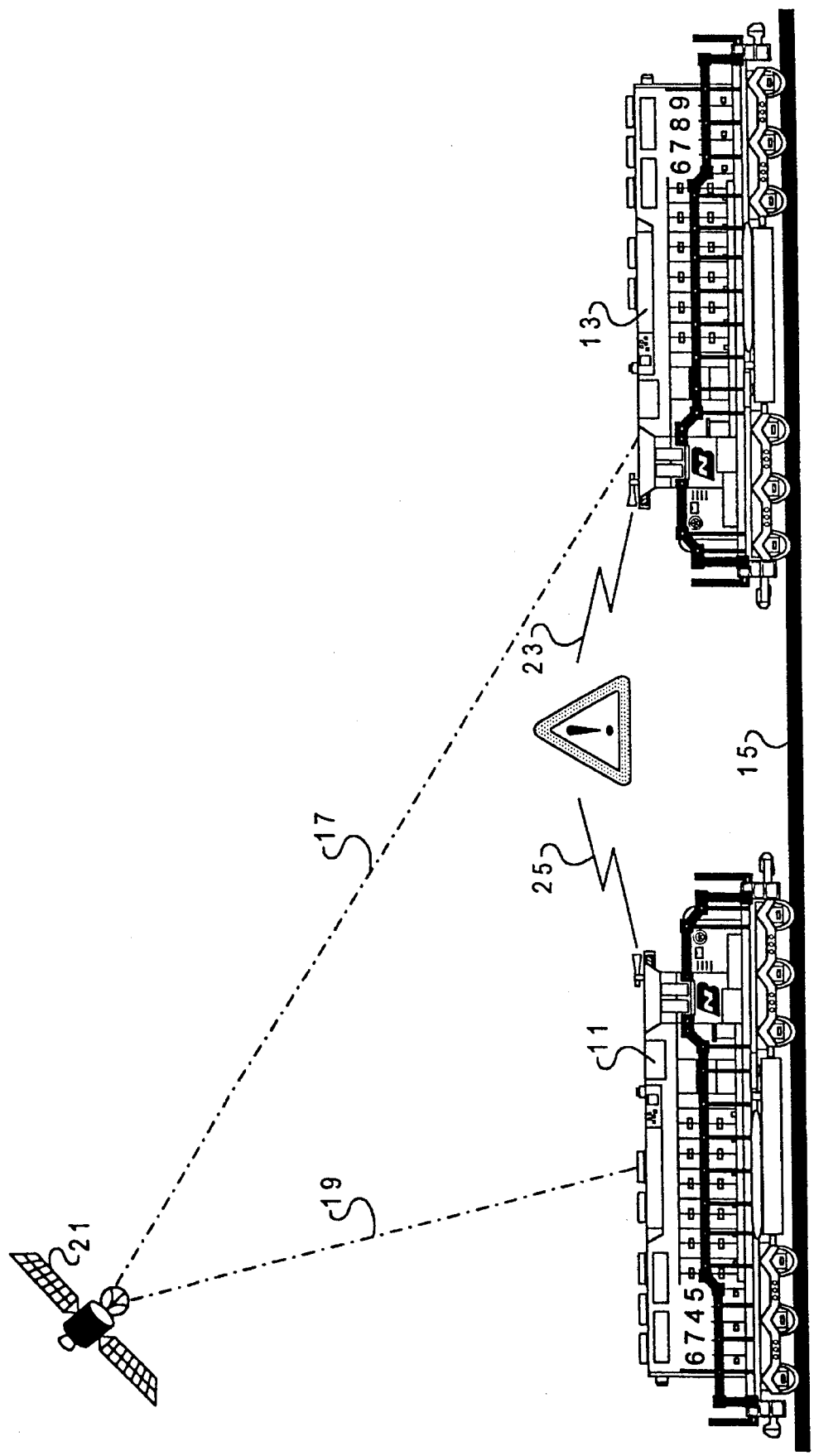
FIG. 1 is a pictorial representation of two locomotives that are collision candidates, each receiving signals from a GPS satellite and from each other.

With reference now to the figures and in particular with reference to FIG. 1, there is depicted a pictorial representation of two locomotive 11, 13 on a collision course on a track 15 of a railway system. Each locomotive is receiving digitally encoded satellite broadcast signals 17, 19 from global positioning system (GPS) satellites 21. Locomotive 11 is receiving digitally encoded data 23 broadcast from locomotive 13, and locomotive 13 is receiving digitally encoded data 25 broadcast from locomotive 11.

Onboard each locomotive 11, 13 is a "Locomotive Warning Device"(LWD) console 27 (see FIG. 2) that is part of the "Proximity Warning System"(PWS) used to identity locomotives that are collision candidates. On the face of the console 27 is an aural alarm 29 (here a speaker), a digital display 31, an operator input device 33 (here a thumbwheel indicator), visual indicator 35 (in this instance a light covered with a translucent and depressible switch to function as an alarm reset) and an acknowledgement (ACK) switch 37. The digital display 31 arranges data output in four columns of alpha numeric symbols, column 39 entitled "LOC ID" and under which are identified locomotives having the unique symbols "BN6789" and "BN6745", as indicated in FIG. 1. Each locomotive in the railway system is assigned a unique such symbol to distinguish it from all others and is input with an operator input device 33. Columns 41, 43 and 45 designate respectively the "SPEED", "DIST"(distance in miles) and "DIR/HDNG"(direction of travel or heading) of a collision candidate with respect to a host locomotive (not shown). Locomotive BN6789 and BN6745 are each equipped with a similar Locomotive Warning Device (LWD) 27 for identification of collision candidates, including the host locomotive.

Figure 3:
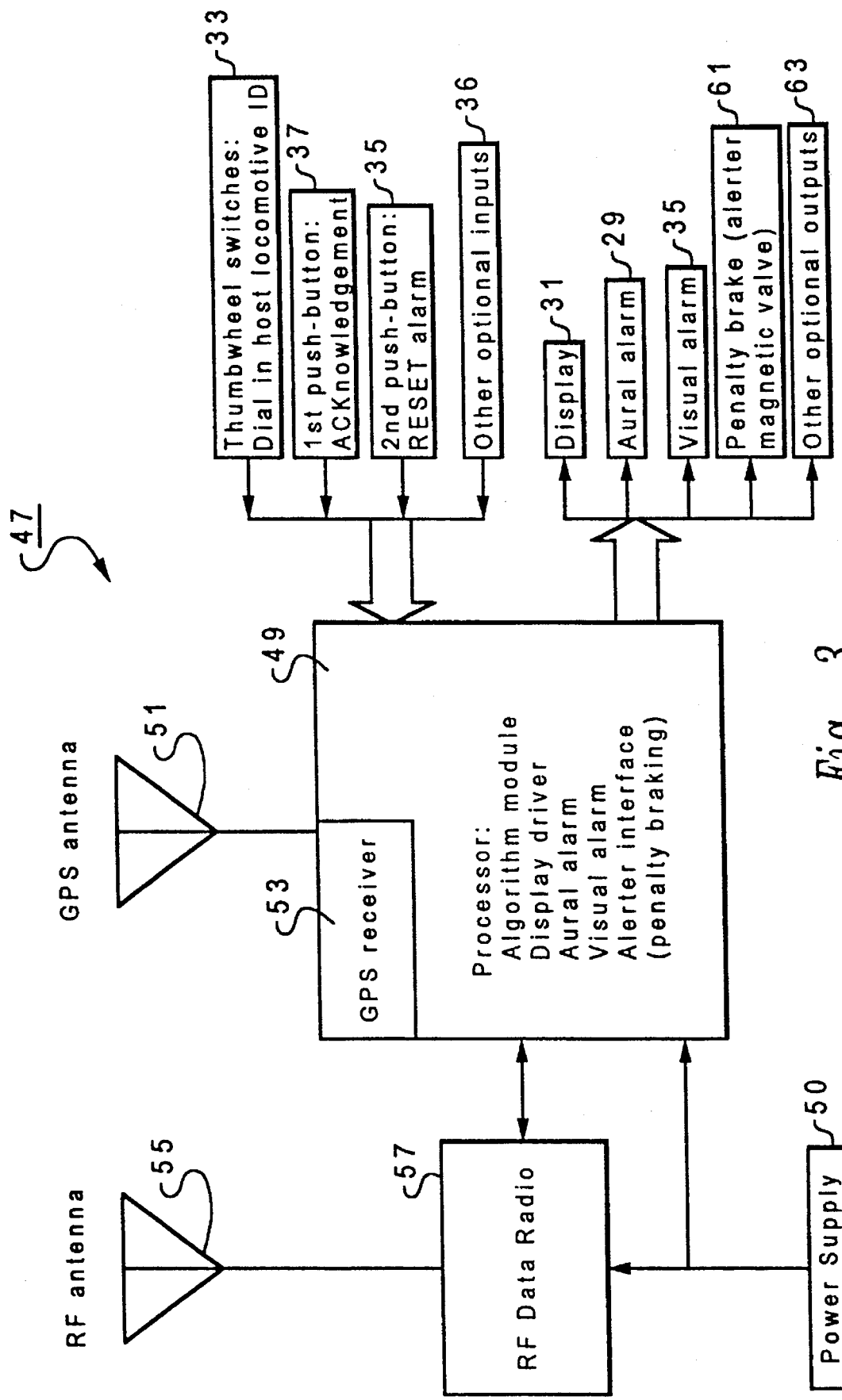
FIG. 3 is a schematic representation of electronic devices to implement the proximity warning system of FIG. 2. 16

FIG. 3 is a block diagram depicting electronic components of the Locomotive Warning Device 27, including a data processor 49 which is utilized to receive digitally encoded information from GPS satellites 21, through a GPS antenna 51 and GPS receiver 53. The data processor 49 creates a first data frame containing the host or a first locomotive geographical location, speed and direction of travel and is driven by power supply 50.

RF antenna 55 receives digitally encoded data broadcast from another or second train that could be a collision candidate in the railway system through RF Data Radio 57, which is input into processor 49 to create a second data frame containing the geographical location, speed and direction of travel of the second train. The RF radio 57 operates in two modes to broadcast the first data frame to other locomotives within the broadcast range in the railway system.

Processor 49 has a plurality of inputs and a plurality of outputs. It receives as an input the global positioning data from GPS receiver 53. It also receives as an input the radio frequency data from locomotives in the same area from RF data radio 55. It receives as an input the switch configuration of the thumbwheel indicator switch 33 which uniquely identifies the train in which the system is resident. This information is encoded into the first data frame along with the geographical local, speed and direction of travel/heading information. It includes as an input an acknowledgment or first push-button switch 37 which is manually activated by the engineer to acknowledge that an alarm signal has been received. It also includes as an input a second or alarm reset push-button 35 switch which resets the alarm and other optional inputs 36 such as track 15 identification, which can be included in the data frames.

There are a number of outputs from the processor 49, including those to the visual, digital display 31 of the locomotive warning device console 27, the aural alarm 29, the visual alarm 35, penalty brake 61 and other optional outputs 63.

Figure 2:
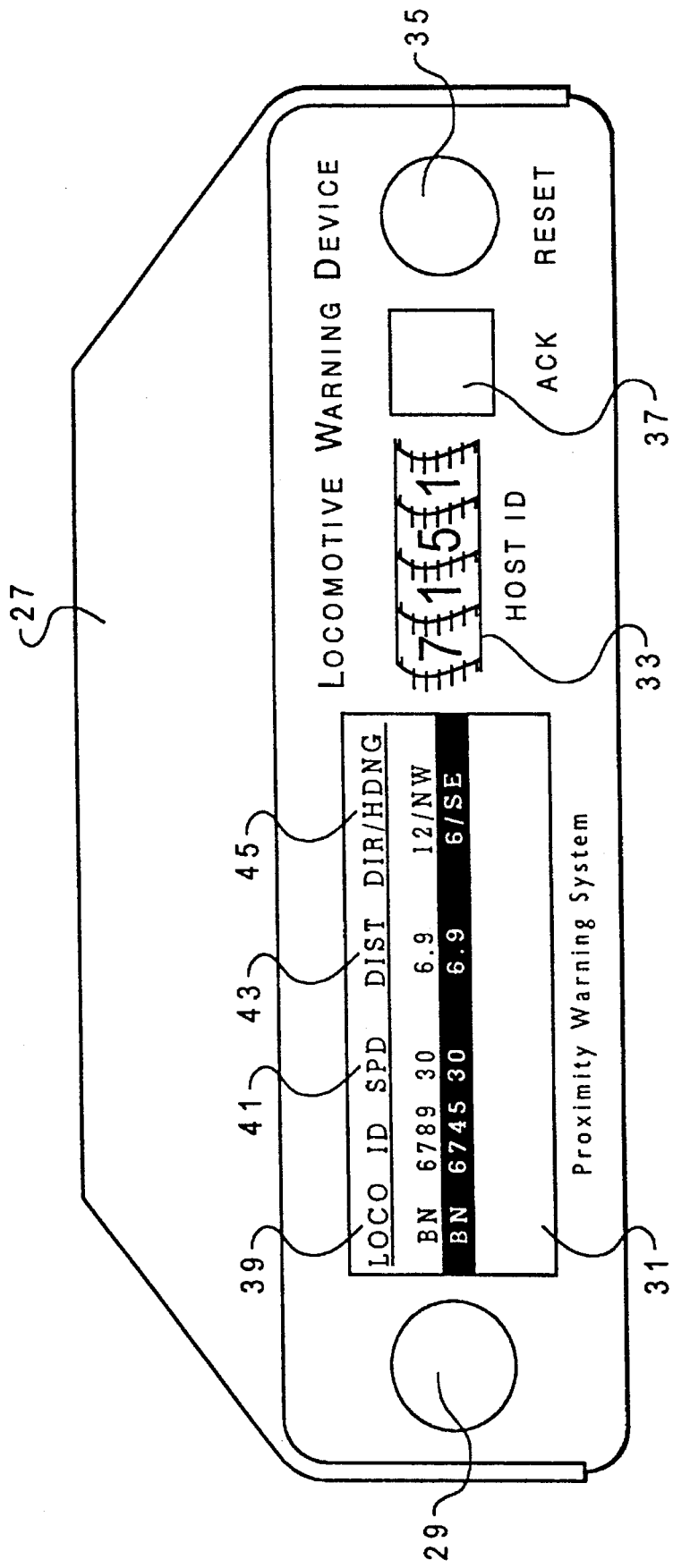
FIG. 2 is pictorial representation of an onboard proximity warning system console with user interfaces including aural and visual warning devices and a digital display to warn of collision candidates.

Thumbwheel switch 33 is used for entering an identification unique to the host locomotive. The LWD 27 of FIG. 2 is utilized to display the locomotive identification, speed, distance, and direction for all locomotives within a 7-mile range. If no trains are within the 7-mile range, it displays only the host locomotive identification and speed. If other trains are within range, the closest train will be displayed first, with all other trains arranged by order of distance from the host train. As can be seen in FIG. 2, locomotive ID No. BN6789 is traveling at a speed of 30 miles per hour and is 6.9 miles away in the 12 o'clock direction heading northwest (NW). Locomotive ID No. BN6745 is traveling at a speed of 30 miles per hour and it is located a distance of 6.9 miles from the host locomotive in the 6 o'clock direction heading southeast (SE).

Processor 49 of FIG. 3 is programmed to determine from the first and second data frames the distance to a potential collision candidate and to provide an audible and visual alarm when a locomotive comes within a prescribed distance interval and is thus identified as a collision candidate. In the preferred embodiment, that distance interval is a 7-mile range.

The processor includes an algorithm module, display driver, aural and visual alarm interfaces and alerter interface to control the penalty brake. If a train is within 7-miles of the host, the audio alarm 29 and the visual alarm 35 provide indication to the engineer that a train is within a 7-mile range. The engineer acknowledges this notification by pressing the acknowledgment (ACK) switch 37 to silence the audio alarm 29. Unless the acknowledgment switch 37 has been depressed, the audio alarm 29 will sound to alert the engineer of possible collision until the alarm is reset. The alarm/reset switch 35 serves a dual function. It provides a visual alarm (in the form of a flashing red light) which cannot be silenced by actuation of acknowledgment switch 37.

After radio communication with the crew of the approaching train, the alarm may be reset by pushing this switch. Locomotives commonly have two-way radio communication equipment (not shown). At that time, the red light will cease to flash but will remain in an on condition, and will only be turned off when the approaching train passes from range. If this switch is not reset when the approaching train comes within a preferred range of 3 miles, a penalty brake 61 is applied automatically to stop the train by engine de-throttling and brake application.

Forcing the engineer to communicate by radio with the crew of the oncoming train prior to allowing resetting of the proximity warning device insures that such communication occurs. If the engineer fails to take the actions necessary to initiate communication with the crew of the approaching train, it is appropriate that the brake be automatically applied, since the possibility of an accident exists.

In operation and when the host train is ready to depart for its destination, the yardmaster should be called for permission to turn on the proximity warning device. Once on, the locomotive warning device 27 will display the identification of the host locomotive. If the identification present in display 31 does not match the identification of the host locomotive, the thumbwheel switch 33 is utilized to alter the identification. The proximity warning system will test itself once the host locomotive obtains the low speed of 1 mile per hour, and will sound the audible and flash the visual alarm to test their operating condition. The engineer may depress the acknowledgment switch 37 to acknowledge the self-testing operation. This will silence the audio alarm. Depressing the alarm/reset push-button 35 will deactivate the flashing red light.

Upon detection of an approaching train within a preferred 7-mile range, display 31 will display the second locomotive ID number, the speed, the distance, and direction of the detected train. Audio alarm 29 will sound, and alarm/reset switch 35 will flash.

Acknowledgment switch 37 is depressed to deactivate audio alarm 29. The engineer of the host train should contact the approaching train on a voice radio to confirm the validity of the other train's authority. After such communication occurs, the engineer should depress the alarm/reset switch 35, which will turn the flashing red light to a steady red light. Additionally, the information displayed in display 31 will then move from a highlighted display mode to a normal display mode. The speed, distance, direction of the oncoming locomotive will be displayed in display 31, and the alarm/reset switch will hold a steady red display until the train has passed outside of the 7-mile range.

When multiple trains are within the prescribed distance range, the closest train such as BN6789 will be displayed at the top of the display 31. Each train in display 31 which has not been reset will be displayed in a highlighted format such as BN6745, and the red light of alarm/reset switch will flash. The engineer should contact each of the oncoming trains in the order of proximity.

If the engineer does not respond properly, audible alarm 29 will continue to be activated. Further, in display 31, the train which has not been processed properly will be displayed in a highlighted format such as BN6745. In addition, the alarm/reset switch 35 will continue to flash. If the engineer fails to take the appropriate action, and the oncoming train approaches a minimum allowable distance, preferably of 3 miles, a penalty brake 61 will automatically stop the train.

Upon arrival of the locomotive at its destination terminal or yard, the engineer will contact the yardmaster for permission to turn off the proximity warning system when the train is within a 5-mile distance of the terminal or yard to avoid unnecessary interaction with other trains or yard equipment.

Figure 4:
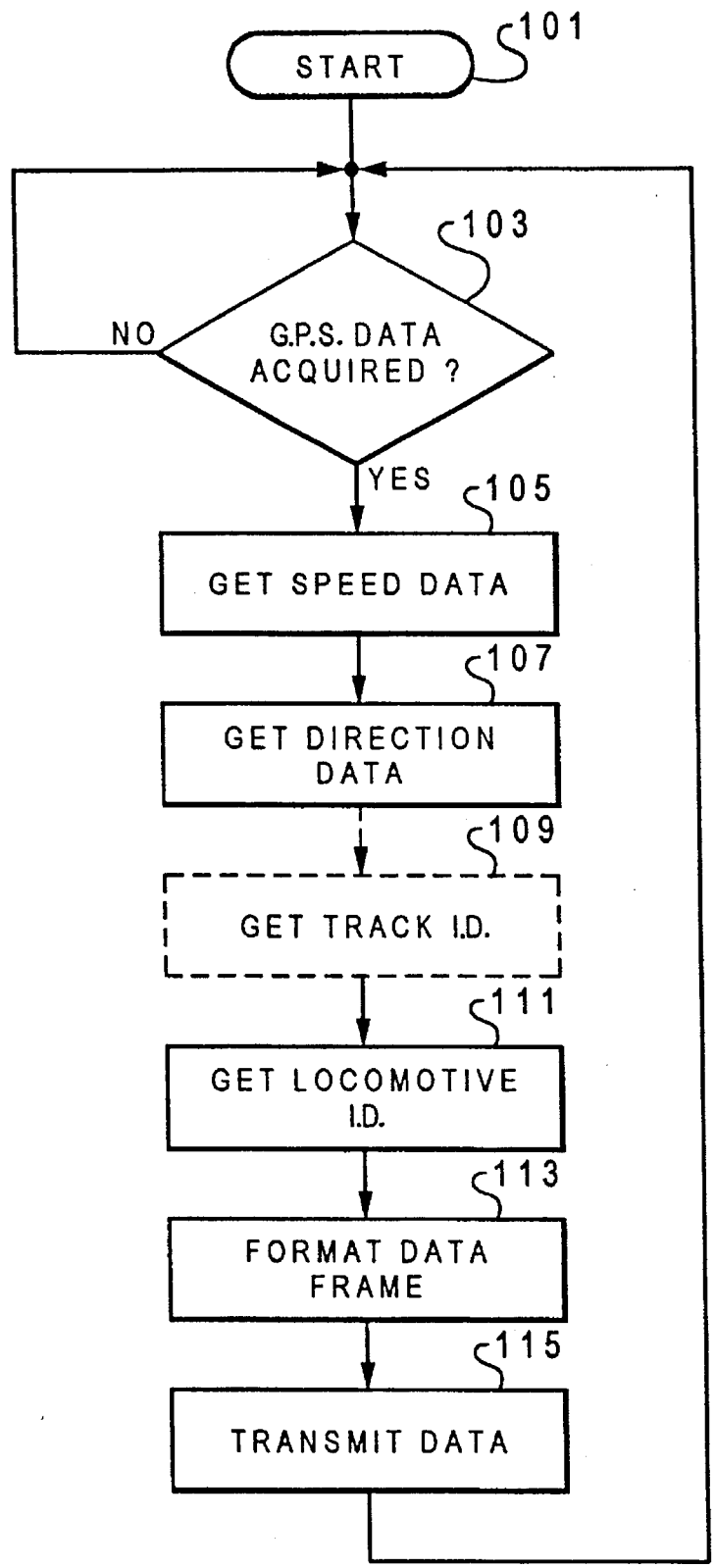
FIG. 4 is a logic flowchart illustrating a GPS based data acquisition and data transmission method and system of the present invention.

FIG. 4 is a high level logic flowchart which illustrates a GPS based data acquisition process for accomplishing the above described collision avoidance method and system which may be implemented within an appropriately programmed processor, such as processor 49. As illustrated, the process begins at block 101, entitled "Start", thereafter passing to block 103, which illustrates a determination of whether there is acquisition of GPS data. If "no", the process returns in an iterative fashion to await further instruction. If "yes", the process passes to block 105 which depicts the obtaining of speed data from the GPS and to block 107 which illustrates obtaining of direction data, to optional block 109 which illustrates the obtaining of track identification, and to block 111 which illustrates the obtaining of the identification of the locomotive. Next, the process passes to block 113 which illustrates the process of formatting a data frame and to block 115 which depicts the transmitting of the data frame.

Figure 5:
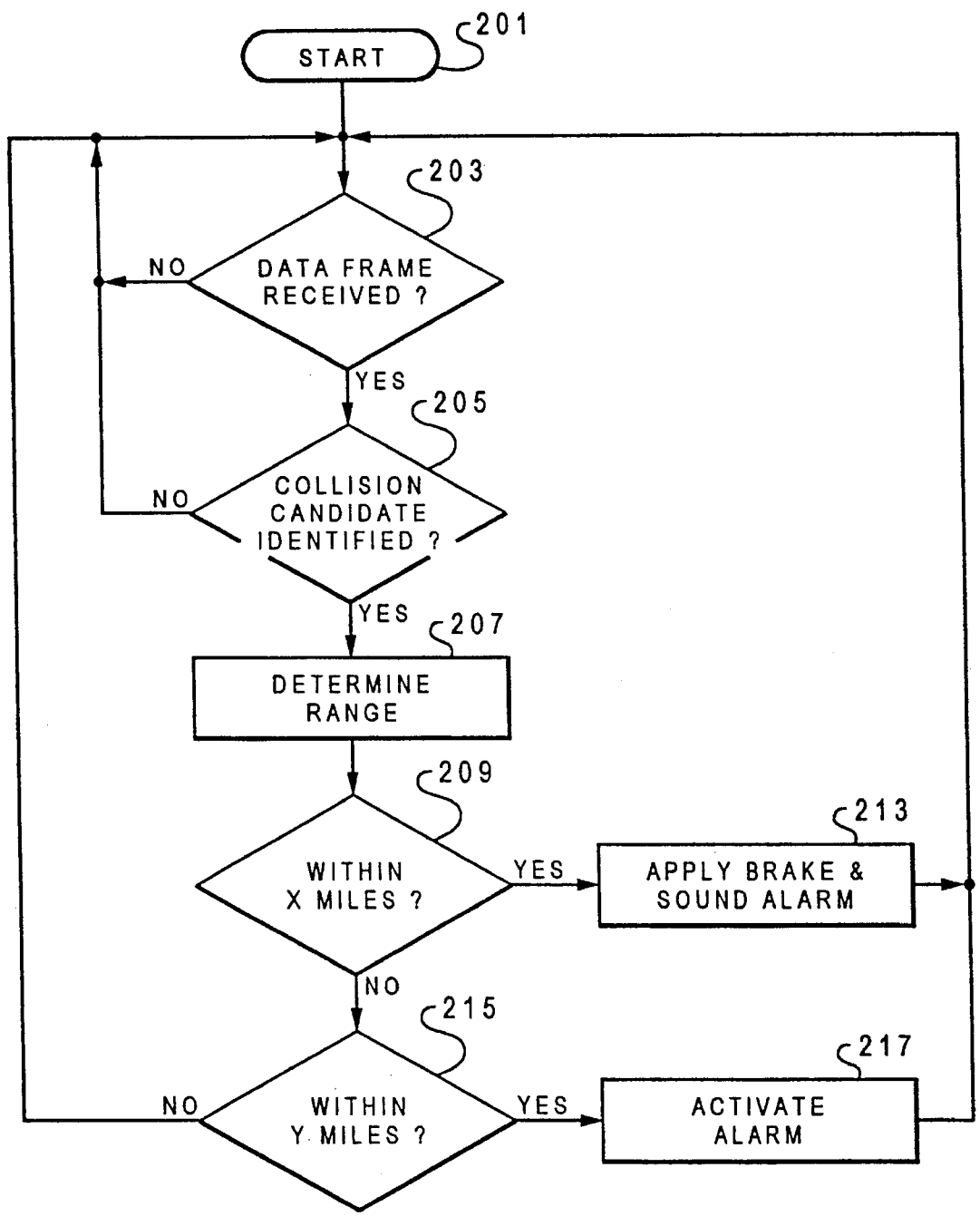
FIG. 5 is a logic flowchart illustrating a locomotive based method and system for data reception from signals broadcast from another locomotive and the GPS to identify a collision candidate and to invoke collision avoidance measures.

FIG. 5 is a high level logic flowchart which illustrates a locomotive based method and system for the acquisition of data from signals from another locomotive and the GPS to identify a collision candidate and to invoke collision avoidance measures. The process begins at block 201, entitled "Start", thereafter passes to block 203 which depicts the initiation of a determination of whether a data frame has been received. If "no", the process returns in a iterative fashion to await further instruction. If "yes", the process passes to block 205 which depicts a determination if a collision candidate has been identified. If "no", the process returns to await further instruction. If a collision candidate is identified as being within the programmed parameters, the process passes to block 207 which illustrates a determination if the candidate is within the prescribed range. The process passes then to block 209 which depicts a determination if the candidate is within X miles, preferably three miles. If "yes" the process passes to block 211 which illustrates activation of the braking system and the programmed alarm. If "no", the process passes to block 215 that illustrates a determination if the candidate is within Y miles, preferably seven. If "no", the process returns in a iterative fashion to start anew, awaiting receipt of a data frame. If "yes" the process passes to block 217 which depicts the activation of an alarm and then returns iteratively to await another data frame. Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

What is claimed is:

1. A method of locomotive collision avoidance between two locomotives and associated trains operating in railway system, comprising:

periodically receiving on each locomotive digitally encoded data from a global positioning satellite system;

creating a first data frame in each locomotive containing its identity, geographical location, speed and direction of travel;

broadcasting from each locomotive digitally encoded signals containing its respective first data frame;

receiving in each locomotive the first data frame from the other locomotive as a second data frame;

processing said first and second data frames in a first locomotive to determine if a second locomotive is a collision candidate;

initiating collision avoidance measure if the second locomotive is determining to be a collision candidate by:
initiating both an audio and visual warning within the first locomotive when said locomotives are separated by less than a selected distance;
permitting the audio alarm to be reset only after intiation of voice communication with the second locomotive; and
braking the first locomotive when said locomotives are separated by a second, closer distance in response to a failure to initiate voice communication with said second locomotive.

2. The method defined by claim 1 which further comprises the step of displaying in each locomotive the distance between said locomotives, as well as the identity, geographical location, speed and direction.

3. The method defined by claim 1 wherein said collision avoidance measures further comprise the step of de-throttling the engine.

4. The method defined by claim 1 wherein the identity of each locomotive is digitally encoded into a respective data frame with an onboard operator input device.

5. A system of locomotive collision avoidance between two locomotives and associated trains operating in a railway system, comprising:

means for periodically receiving on each locomotive digitally encoded data from a global positioning satellite system;

means for creating a first data frame in each locomotive containing its identity, geographical location, speed and direction of travel;

means for broadcasting from each locomotive digitally encoded signals containing its respective first data frame;

means for receiving in each locomotive the first data frame from the other locomotive as a second data frame;

means for processing said first and second data frames in a first locomotive to determine if a second locomotive is a collision candidate;

means for initiating in said locomotives collision avoidance measures if the second locomotive is determine to be collision candidate by:

initiating both an audio and visual warning within the first locomotive when said locomotives are separated by less than a selected distance;

permitting the audio alarm to be rest only after initiation of voice communication with said second locomotive; and braking the first locomotive when said locomotive are separated by a second, closer distance in response to a failure to initiate voice communication with said second locomotive.

6. The system defined by claim 5 which further comprises means for displaying in each locomotive the distance between said locomotives, as well as the identity, geographical location, speed and direction.

7. The system defined by claim 5 wherein said collision avoidance measures further comprise means for de-throttling the engine.

8. The system defined by claim 5 wherein the identity of each locomotive is digitally encoded into a respective data frame with an onboard operator input device.

* * * * *